(12) United States Patent
Swank et al.

(10) Patent No.: US 6,737,796 B2
(45) Date of Patent: May 18, 2004

(54) CATHODE-RAY TUBE MOUNTING APPARATUS

(75) Inventors: Harry Robert Swank, Lancaster, PA (US); Stephen Thomas Opresko, Lancaster, PA (US)

(73) Assignee: Thomson Licensing S. A., Boulogne Cedex (FR)

( * ) Notice: Subject to any disclaimer, the term of this patent is extended or adjusted under 35 U.S.C. 154(b) by 400 days.

(21) Appl. No.: 09/849,471

(22) Filed: May 4, 2001

(65) Prior Publication Data

US 2002/0163293 A1 Nov. 7, 2002

(51) Int. Cl.⁷ .................................................. H01J 31/00
(52) U.S. Cl. ....................... 313/477 R; 313/461; 313/75; 313/478; 313/479; 313/482; 348/836; 348/843
(58) Field of Search ................................. 313/477 R, 75, 313/461, 478, 479, 482, 364, 476, 402–408; 220/2.1 A, 2.1 R; 348/836, 843

(56) References Cited

U.S. PATENT DOCUMENTS

| | | | |
|---|---|---|---|
| 3,207,936 A | 9/1965 | Wilbanks et al. | 313/75 |
| 3,220,592 A | 11/1965 | Powell et al. | 220/2.1 |
| 3,278,682 A | 10/1966 | Panis et al. | 178/7.8 |
| 3,558,818 A | 1/1971 | DeBoer | 178/7.82 |
| 3,835,250 A | 9/1974 | Kaijuko et al. | 178/7.8 |
| 3,997,811 A * | 12/1976 | Tom et al. | 313/404 |
| 4,004,092 A | 1/1977 | Rogers | 358/246 |
| 4,899,080 A * | 2/1990 | Vriens et al. | 313/477 R |
| 4,949,008 A * | 8/1990 | Chihara | 313/402 |
| 5,270,826 A * | 12/1993 | Fowler | 358/246 |
| 5,459,527 A * | 10/1995 | Lin | 348/819 |
| 5,699,132 A * | 12/1997 | Adachi et al. | 348/836 |
| 5,742,360 A * | 4/1998 | Kwon et al. | 348/839 |
| 6,124,901 A | 9/2000 | Diven et al. | 348/822 |

* cited by examiner

Primary Examiner—Nimeshkumar D. Patel
Assistant Examiner—Holly Harper
(74) Attorney, Agent, or Firm—Joseph S. Tripoli; Joseph J. Laks; Carlos M. Herrera

(57) ABSTRACT

The present invention provides an improvement in the mounting of a cathode-ray tube within a bezel. The cathode-ray tube includes a unitary shellbond frame having integral mounting lugs which are positioned at locations either in the corners or off of the corners. The mounting lugs are formed with tapered sections along a depth dimension to allow a tube having the shellbond frame applied to be simply lowered into a bezel having lug receiving recesses of a complimentary shape. The tapered lug and complimentary lug receiving recess provides self-alignment of the tube before it is secured to the bezel.

24 Claims, 5 Drawing Sheets

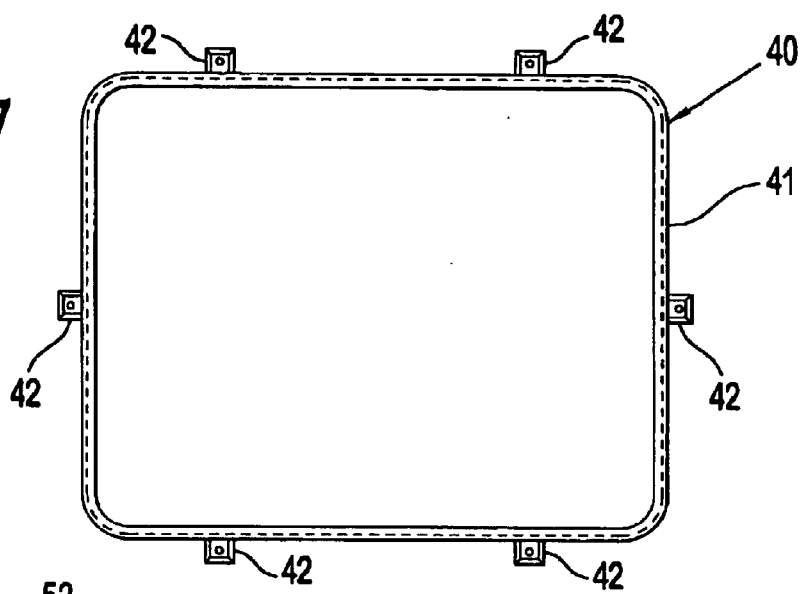
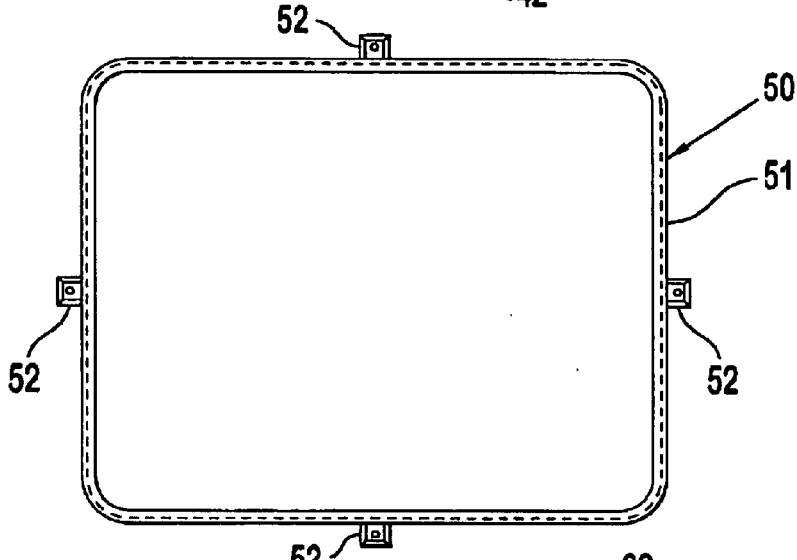
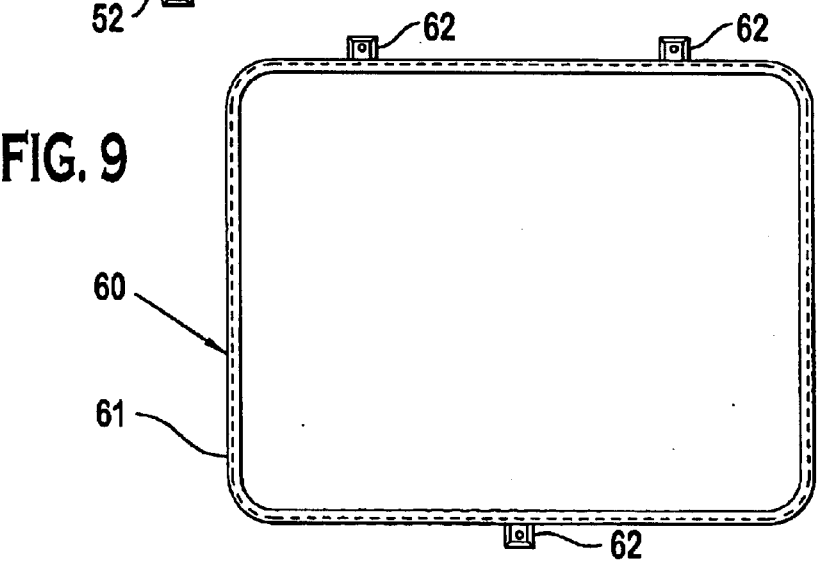

CATHODE-RAY TUBE MOUNTING APPARATUS

FIELD OF THE INVENTION

This invention relates to a mounting apparatus for a cathode-ray tube and more particularly to a mounting apparatus for providing self-alignment and cabinet size reduction.

BACKGROUND OF THE INVENTION

A cathode-ray tube, such as a color picture tube, has a glass envelope that comprises a neck, a funnel and a face-plate panel. The face-plate panel includes a viewing face-plate that is surrounded by a peripheral side wall. When a cathode-ray tube is evacuated to a very low internal pressure, it is subjected to the possibility of implosion caused by the stresses produced on the tube envelope by atmospheric pressure. In order to reduce the possibility of implosion, as well as to reduce the effects of an implosion should it occur, a tension band usually is applied externally to the face-plate panel side wall. Such a tension band applies compressive forces to the side wall which redistribute the stresses in the face-plate panel.

As known in the art and shown in FIG. 1, mounting lugs 16, integral with, attached to, or disposed between the band 14 and the tube side wall, are used to support the tube 22 within a cabinet 10. Typically, the mounting lugs 16 are positioned at the corners of the tube 22 because they are dependent on the tension of the band in the corners of the tube to provide the force to hold them in place. However, set designers have found this mounting technique to be somewhat undesirable, because the internal size of a cabinet 10 must accommodate the tube 22 plus the mounting lugs 16, which adds from about 5–9 cm. to the overall dimensions of the tube 22. Due to thermal expansion characteristics of the tube and known tension bands 14, mounting lugs 16 and holes formed therein are formed larger than necessary to accommodate size and portion variations due to the thermal expansion during tube processing. Dimensioning these components to be larger contributes to increasing overall dimensions of the mounting system and set.

In assembly, a tube 22 having the tension band 14 and lugs 16 applied, is placed over an opening in a bezel 10 face down and the mounting lugs openings are aligned with bolts or studs 20 in the bezel 10. Such an alignment technique requires manual intervention to align the lugs 16 with the openings in the bezel 10. Set designers have expressed a desire for a mounting technique that would decrease the dimension of the mounting system, so that a trimmer visual appearance could be achieved. Set designers have also expressed a desire for a simpler more automated mounting technique that would allow the tube to be easily aligned within the set opening or bezel. The present invention provides mounting means, which permits a reduction in the size of the cabinet as well as a simple self-alignment apparatus for mounting the cathode-ray tube into the cabinet.

SUMMARY OF THE INVENTION

The present invention provides an improvement in the mounting of a cathode-ray tube within a bezel. The cathode-ray tube includes a unitary shellbond frame having integral mounting lugs which are positioned at locations either in the corners or off of the corners. The mounting lugs are formed with tapered sections along a depth dimension to allow a tube having the shellbond frame applied to be simply lowered into a bezel having lug receiving recesses of a complimentary shape. The tapered lug and complimentary lug receiving recess provides self-alignment of the tube before it is secured to the bezel.

BRIEF DESCRIPTION OF THE DRAWINGS

The invention will now be described by way of example with reference to the accompanying figures of which:

FIG. 7 is a front view of a first alternate shellbond frame.

FIG. 8 is a front view of a second alternate shellbond frame.

FIG. 9 is a front view of a third alternate shellbond frame.

DETAILED DESCRIPTION OF THE INVENTION

Figures 1, 2:
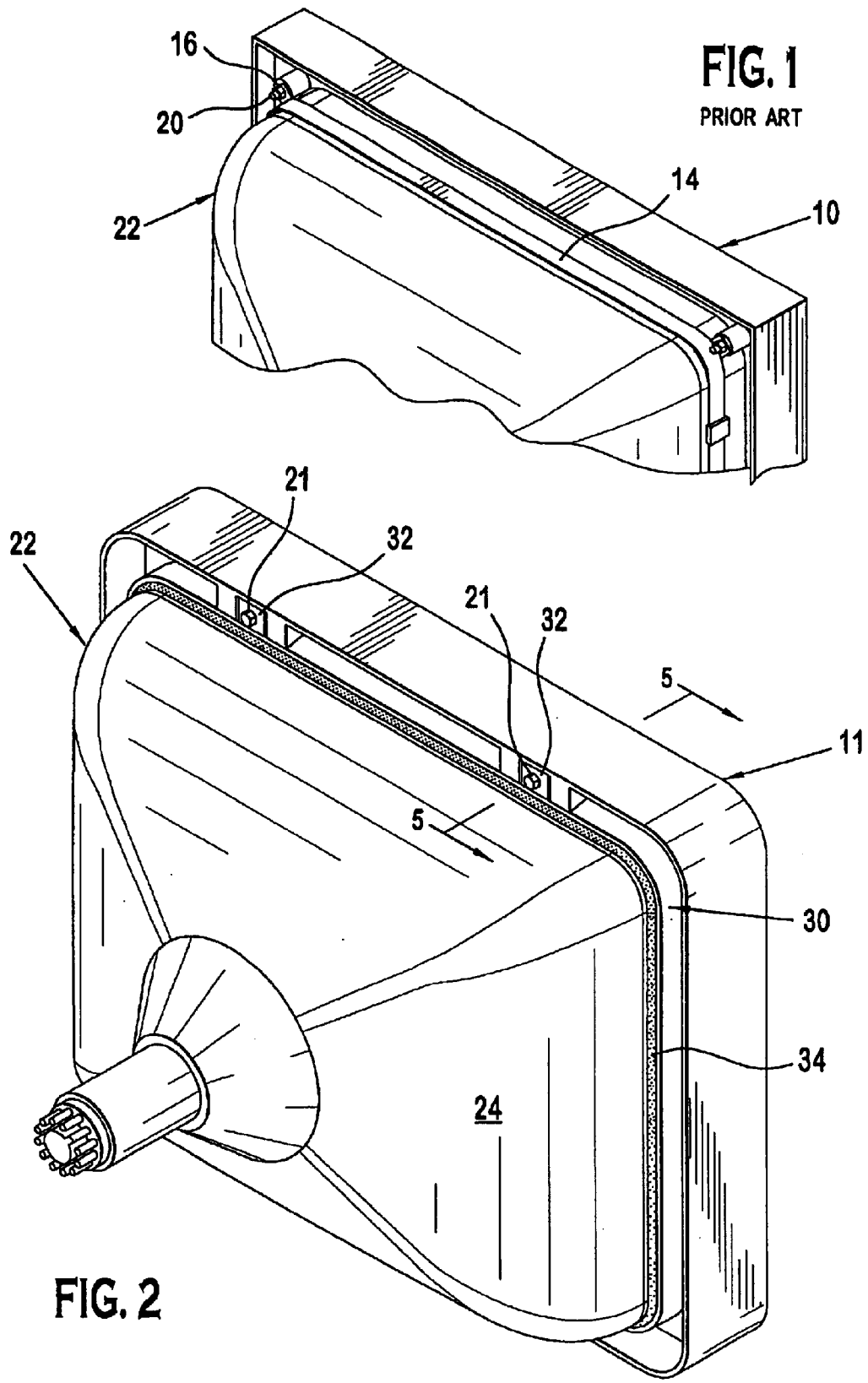
FIG. 1 is a perspective rear view of a prior art mounting arrangement for a cathode-ray tube.
FIG. 2 is a perspective rear view of a cathode-ray tube mounted within a bezel according to the present invention.
Figure 3:
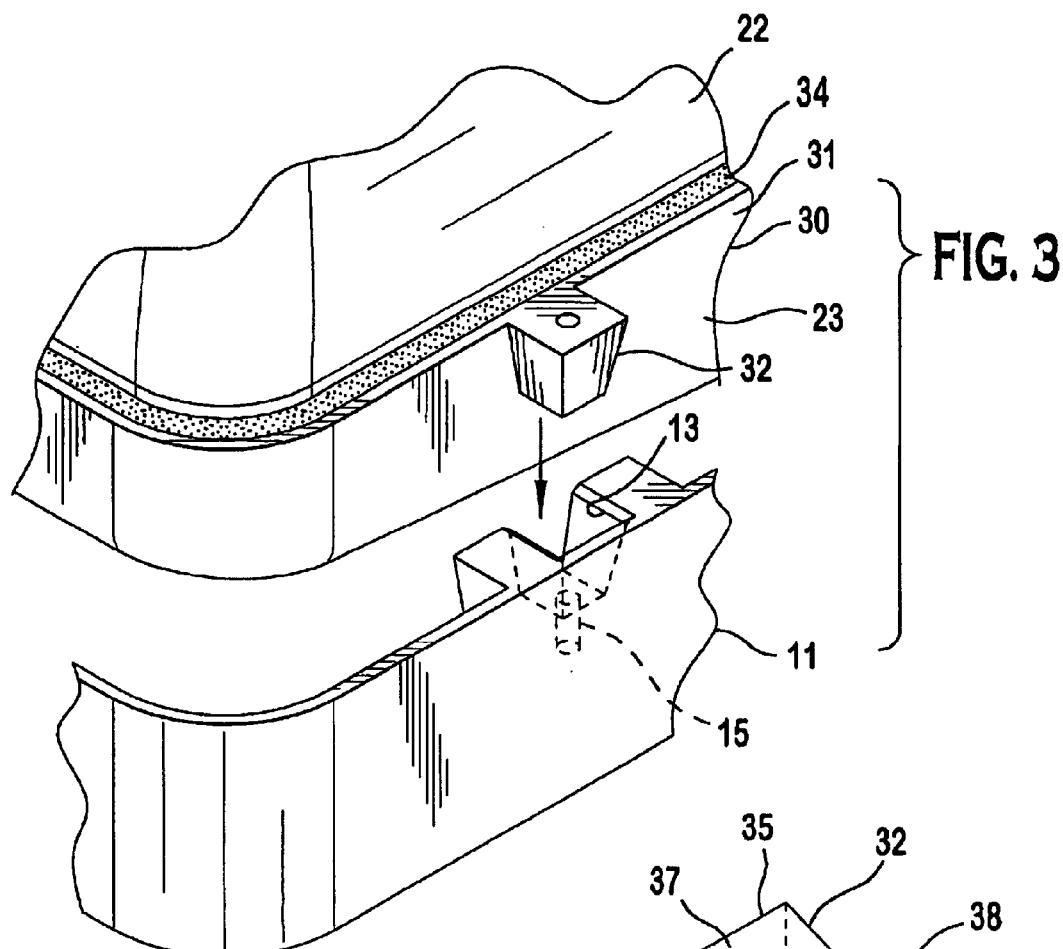
FIG. 3 is a partial perspective view of a mounting lug according to the present invention.
Figure 4:
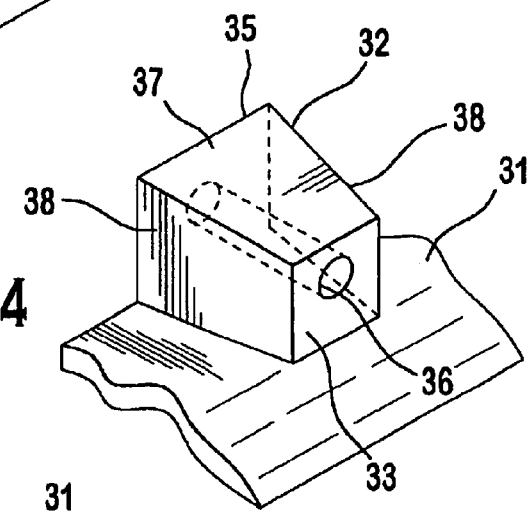
FIG. 4 is a cutaway perspective view of the mounting lug of FIG. 3.
Figure 5:
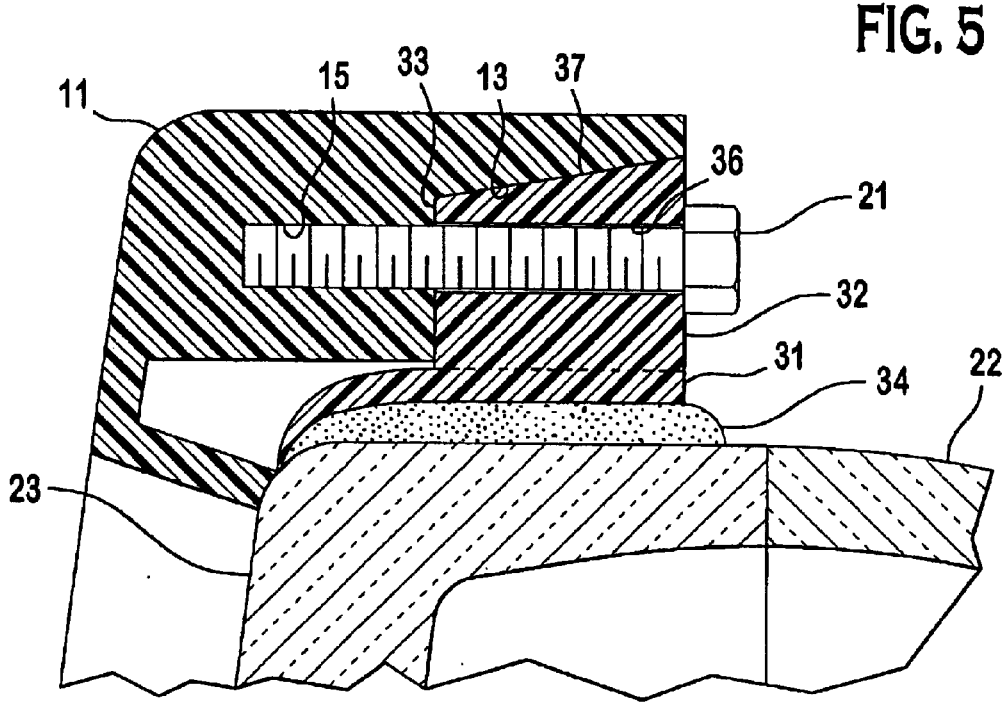
FIG. 5 is a cross-sectional view taken along the line 5—5 of FIG. 2.
Figure 6:
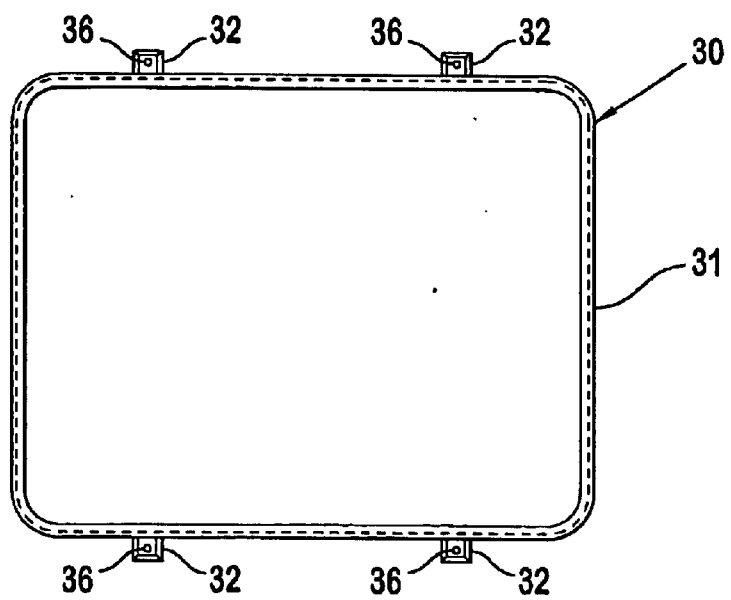
FIG. 6 is a front view of a shellbond frame for use in the mounting arrangement of FIG. 2.

The invention will first be described generally with reference to FIG. 2 and then in greater detail with reference to the remaining Figures. Referring first to FIG. 2, a cathode-ray tube 22 is shown installed into the front portion or bezel 11 of a set cabinet. A shellbond frame 30 surrounds a juncture between the tube face-plate 23 (as shown in FIG. 5) and funnel 24. The shellbond frame 30 serves as an implosion protection device as well as a mounting device. A plurality of integral mounting lugs 32 are provided around the shellbond frame 30. The integral mounting lugs 32 are fixed to the bezel 11 with appropriate fasteners such as nuts, bolts, or studs 21. Referring to FIGS. 3 and 6, the shellbond frame 30 will be described in greater detail. The shellbond frame 30 is preferably formed of a molded or cast material and consists of a band portion 31 and a plurality of integral mounting lugs 32. The integral mounting lugs 32 are positioned around the band 31 at desired locations which are not limited to being positioned in the corners of the band portion 31. As best shown in FIGS. 3 and 4, each integral mounting lug 32 extends outward from the band portion 31. Each integral mounting lug 32 is profiled to have a tapered front surface 37 and a pair of opposing tapered side surfaces 38. The tapered surfaces 37, 38 are tapered inward from a rear side 35 to a front side 33. A passageway 36 for receiving an appropriate fastener extends through the lug 32 from the front side 33 to the rear side 35.

Referring to FIG. 3, the bezel 11 features lug receiving recesses 13 positioned at appropriate locations around its periphery. The lug receiving recesses 13 extend inward from an outer surface of the bezel 11 to receive the integral mounting lugs 32. The inner contour of each lug receiving recess 13 is complimentary to the tapered surfaces 37, 38 of each integral mounting lug 32. A fastener opening 15 is provided in the base of each lug receiving recess 13.

The shellbond frame 30 is assembled to the cathode-ray tube 22 by a curable adhesive 34 applied between these components. Once the shellbond frame 30 is secured to the cathode-ray tube 22 by the adhesive 34, it is then applied to the bezel 11 as shown in FIG. 3. This assembly process is simplified in that pre-alignment of the shellbond frame 30 and cathode-ray tube sub-assembly and the cabinet is not required because of the interaction between the tapered surfaces 37, 38 and the complimentary inner contour of the respective lug receiving recesses 13. Once the integral mounting lugs 32 are correctly seated into the lug receiving recess 13, each fastener receiving opening 15 will be aligned with a respective passageway 36. A bolt 21 or other appropriate fastener is then applied to secure the mounting lugs 32 to respective lug receiving recesses 13 as best shown in FIG. 5.

It should be understood that since the mounting lugs 32 are integral with the band portion 31 and the entire shellbond frame 30 is adhered to the cathode-ray tube 22, placement of the integral mounting lugs 32 around the band portion 31 is less critical than in the prior art which required placement in the corners. For example, the integral mounting lugs may be placed at various locations around the periphery of the band portion 31 as shown in FIGS. 7–9. FIG. 7 shows a first alternate shellbond frame 40 having integral mounting lugs 42 placed on opposite sides of both the length and width of the band portion 41. FIG. 8 shows a second alternate shellbond frame 50 in which a single integral lug 52 is placed approximately in the center of each side of the band portion 51. FIG. 9 shows a third alternate shellbond frame 60 in which three integral mounting lugs 62 are placed in a triangular orientation along opposite sides of the band portion 61. It should be understood by those reasonably skilled in the art that although several alternatives have been shown here for lug position, the lugs may be positioned at any location either in the corners or outside the corners of the band portion. This allows for variations and reductions in bezel dimensions.

Figure 10:
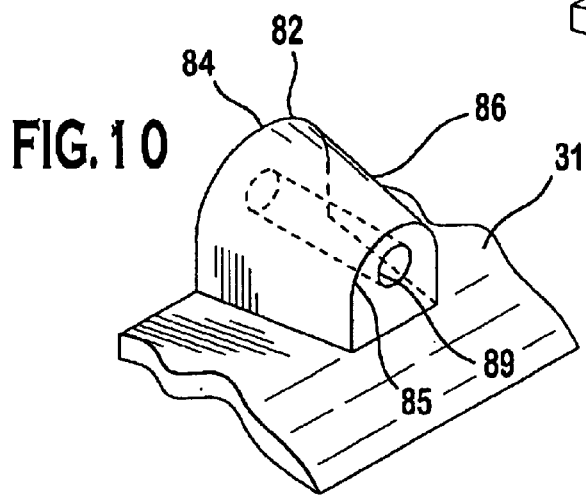
FIG. 10 is a cutaway perspective view of a first alternate mounting lug.

FIG. 10 shows a first alternate integral mounting lug 82 having a different profile. This first alternate mounting lug 82 is profiled to have a curved outer surface 86. The curved outer surface 86 is tapered such that its radius is smaller at a front side 85 than its radius at a rear side 84. A similar passageway 89 passes through the mounting lug for receiving an appropriate fastener. It should be understood by those reasonably skilled in the art that various tapered surface configurations are possible for achieving the same alignment of a shellbond frame and cathode-ray tube sub-assembly to a bezel. Use of this first alternate mounting lug 82 could be with the lug receiving recesses 13 shown in FIG. 3 or with an alternate lug receiving recess which is more precisely contoured to be complementary to the lug shape.

Figure 11:
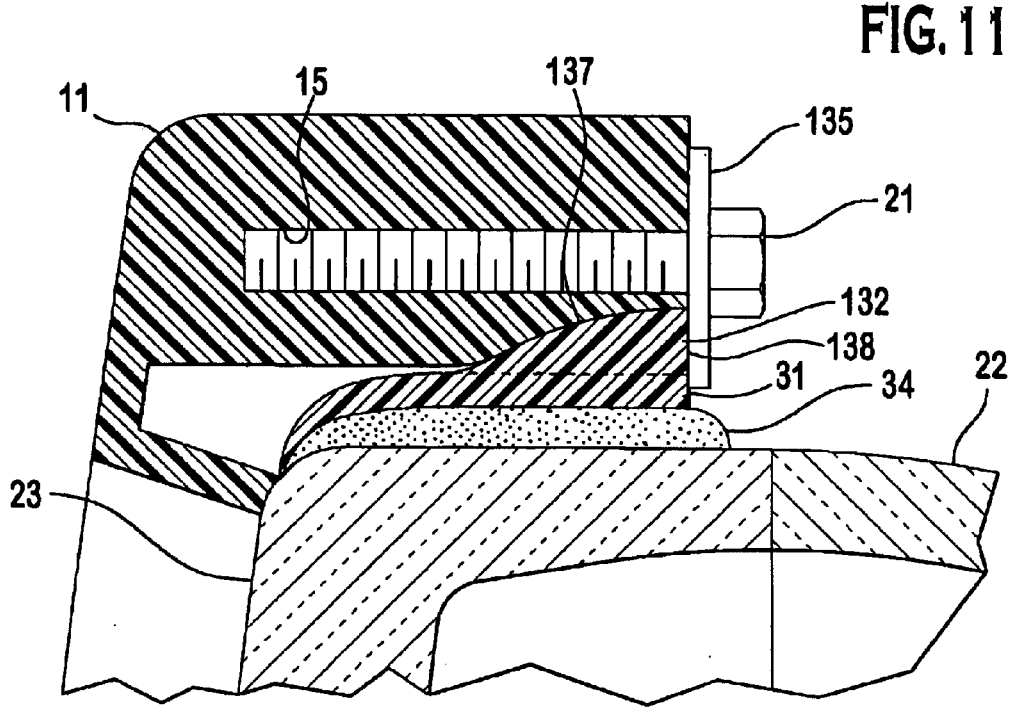
FIG. 11 is a cross-sectional view similar to that of FIG. 5 showing a second alternate mounting lug.
Figure 12:
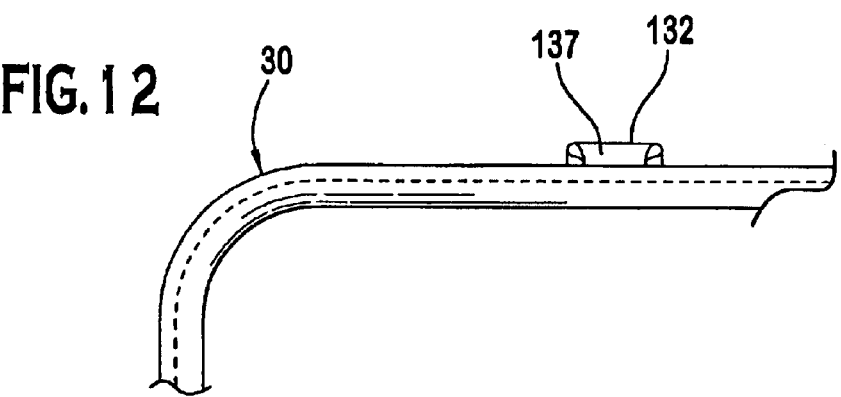
FIG. 12 is a front view of a shellbond frame having the second alternate mounting lug of FIG. 11.

FIGS. 11 and 12 show a second alternate integral mounting lug 132 having yet another profile. This alternate mounting lug 132 is profiled to have a curved outer surface 137 which is tapered from a relatively thin section toward the front end of the face-plate panel 23 to a relatively wide portion at a mounting face 138. This second alternate integral mounting lug 132 extends similarly outward from the band portion 31 of the shellbond frame 30. This alternate integral mounting lug 132 is different in that there is no passage way for receiving the fastener 21. Instead, the fastener 21 is similarly applied to the bezel 11 with the addition of a retainer 135 such as a washer or other suitable element that secures the integral mounting lug 132. The fastener 21 passes through the retainer 135 and into the fastener opening 15. The retainer 135 extends over the mounting face 138 to secure the curved outer surface 137 against the bezel 11.

An advantage of the present invention is that a cathode-ray tube having a shellbond frame applied thereto is easily aligned by simply lowering the sub-assembly onto the bezel without the need for visual alignment assistance. Additionally, because the mounting lugs are integral with the shellbond frame, the lugs may be moved off of the corners to allow set manufacturers to reduce the outer dimensions of the bezel and cabinet either along the length or the width dimensions or both. An additional advantage is that because of the more precise alignment achieved by these self-aligning features and because of the precision molding techniques currently available, the passageways 36, may be made smaller because they are less susceptible to thermal expansion and movement during processing.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A mounting apparatus for mounting a cathode-ray tube to a cabinet bezel comprising:
   a shellbond frame being dimensioned to surround the tube;
   a plurality of integral mounting lugs being integrally formed with the shellbond frame and extending outward from the shellbond frame, the mounting lugs being profiled to have a tapered surface along a width dimension; and,
   the bezel having a plurality of mounting lug receiving recesses each receiving a respective mounting lug, each mounting lug receiving recess having an inner contour which is complementary to the tapered surface profile of each mounting lug.

2. The mounting apparatus of claim 1 wherein each mounting lug further comprises a passageway extending from a front aide to a rear side for receiving a fastener.

3. The mounting apparatus of claim 2 wherein each mounting lug receiving recess further comprises a fastener receiving opening being in alignment with the passageway when the mounting lug is inserted into the mounting lug receiving recess.

4. The mounting apparatus of claim 3 wherein each mounting lug further comprises a capered front surface.

5. The mounting apparatus of claim 4 wherein each mounting lug further comprises a pair of opposed tapered side surfaces.

6. The mounting apparatus of claim 3 wherein each mounting lug further comprises a curved outer tapered surface.

7. The mounting apparatus of claim 1 wherein the shellbond frame and the plurality of Integral mounting lugs are formed of a cast material.

8. The mounting apparatus of claim 1 wherein the shellbond frame surrounds a juncture between a tube face plate and a funnel of the tube.

9. The mounting apparatus of claim 8 wherein the shellbond frame is secured to the juncture by an adhesive.

10. A cathode-ray tube with a glass envelope having a tube face-plate connected to a funnel, a shellbond frame surrounding a juncture between the tube face-plate and the funnel, and a mounting apparatus for mounting the cathode-ray tube to a cabinet betel, the mounting apparatus, comprising:

a plurality of mounting lugs being integrally formed with the shellbond frame and extending outward from the shellbond frame, the mounting lugs being profiled to have a tapered surface along a width dimension; and, the bezel having a plurality of mounting lug receiving recesses each receiving a respective mounting lug, each mounting lug receiving recess having an inner contour which is complementary to the tapered surface profile of each mounting lug.

11. A shellbond frame for use in mounting a cathode-ray tube to a set bezel comprising:

a molded implosion protection band portion extending around a peripheral side wall of a face-plate panel between the face-plate panel and a funnel of the cathode-ray tube; and, at least one mounting lug being integrally molded with the band portion and extending outward from the band portion, the mounting lug being profiled to have a tapered surface along a width dimension.

12. The shellbond frame of claim 11 wherein the mounting lug further comprises a passageway extending from a front side to a rear side for receiving a fastener.

13. The shellbond frame of claim 12 wherein the mounting lug further comprises a tapered front surf ace being tapered from a wider portion on the rear side to a narrower portion on the front side.

14. The shellbond frame of claim 13 wherein the mounting lug further comprises a pair of opposed tapered side surfaces being tapered from the wider portion on the rear side to the narrower portion on the front side.

15. The shellbond frame of claim 12 wherein the mounting lug further comprises a curved outer tapered surface being capered from the wider portion on the rear aide to the narrower portion on a front aide.

16. The shellbond frame of claim 11 wherein the mounting lug Includes a passageway for receiving a fastener and the tapered surfaces tapers along the width dimension in a direction parallel to the passageway.

17. The shellbond frame of claim 1 wherein the band portion is secured to the peripheral side wall by an adhesive.

18. The mounting apparatus of claim 10 wherein each mounting lug further comprises a passageway extending from a front side to a rear side for receiving a fastener.

19. The mounting apparatus of claim 18 wherein each mounting lug receiving recess further comprises a fastener receiving opening being in alignment with the passageway when the mounting lug is inserted into the mounting lug receiving recess.

20. The mounting apparatus of claim 19 wherein each mounting lug further comprises a tapered front surface.

21. The mounting apparatus of claim 19 wherein each mounting lug further comprises a pair of opposed tapered aide surfaces.

22. The mounting apparatus of claim 19 wherein each mounting lug further comprises a curved outer tapered surface.

23. The mounting apparatus of claim 10 wherein the shellbond frame and the plurality of integral mounting lugs are formed of a cast material.

24. The mounting apparatus of claim 10 wherein the shellbond frame is secured to the juncture by an adhesive.

* * * * *